(12) United States Patent
Müller

(10) Patent No.: US 10,343,735 B2
(45) Date of Patent: Jul. 9, 2019

(54) RUBBER TRACK CHAIN SEGMENT

(71) Applicant: DST DEFENCE SERVICE TRACKS GMBH, Freisen (DE)

(72) Inventor: Winfried Müller, Remscheid (DE)

(73) Assignee: DST DEFENCE SERVICE TRACKS GMBH, Freisen (DE)

(*) Notice: Subject to any disclaimer, the term of this patent is extended or adjusted under 35 U.S.C. 154(b) by 385 days.

(21) Appl. No.: 15/036,895

(22) PCT Filed: Nov. 11, 2014

(86) PCT No.: PCT/EP2014/003017
§ 371 (c)(1),
(2) Date: May 16, 2016

(87) PCT Pub. No.: WO2015/070974
PCT Pub. Date: May 21, 2015

(65) Prior Publication Data
US 2016/0332684 A1    Nov. 17, 2016

(30) Foreign Application Priority Data

Nov. 16, 2013  (DE) .................. 10 2013 019 232

(51) Int. Cl.
  *B62D 55/253* (2006.01)
  *B62D 55/24* (2006.01)
  *B62D 55/21* (2006.01)

(52) U.S. Cl.
  CPC ........... *B62D 55/253* (2013.01); *B62D 55/21* (2013.01); *B62D 55/24* (2013.01); *B62D 55/244* (2013.01)

(58) Field of Classification Search
  CPC ...... B62D 55/21; B62D 55/215; B62D 55/18; B62D 55/24; B62D 55/205; B62D 55/253
  See application file for complete search history.

(56) References Cited

U.S. PATENT DOCUMENTS 3,734,576 A * 5/1973 Heiple .................. B62D 55/24
                                                              305/158
4,279,449 A * 7/1981 Martin .................... C08K 3/30
                                                              305/178
(Continued)

FOREIGN PATENT DOCUMENTS

| CA | 2455279 A1 * | 7/2005 | ............. B62D 55/07 |
| WO | 2010/130367 A1 | 11/2010 | |
| WO | 2012/142705 A1 | 10/2012 | |

OTHER PUBLICATIONS

PCT, International Search Report, International Application No. PCT/EP2014/003017, dated Feb. 13, 2015.
(Continued)

*Primary Examiner* — S. Joseph Morano
*Assistant Examiner* — Scott A Browne
(74) *Attorney, Agent, or Firm* — Thompson Hine LLP

(57) ABSTRACT

A rubber track chain segment (1, 2) which can be connected via connecting devices (5) at the ends thereof to other rubber track chain segments (2) or to itself (1) to form a segmentable rubber track chain (3), wherein one or more tensile members (4) are introduced between the connecting devices (5) into the rubber track segment (1, 2) in order to increase the tensile load-bearing capability, wherein nipples are arranged at the ends of the tensile members (4), which nipples are set up to be received in an undercut of the connecting devices (5), the rubber band track segment (1, 2) has flexible regions (9) and less flexible regions (8) in an alternating manner, and the ends of the tensile members (4) are positioned in the less flexible regions (8) at the ends of the rubber band track segment (1, 2) so that the tensile members (4), from the exit (19) out of the nipples, run along (Continued)

as long a section (21) as possible through the less flexible regions (8) before they run through the adjoining flexible regions (9).

16 Claims, 8 Drawing Sheets

(56) References Cited

U.S. PATENT DOCUMENTS

| | | | | |
|---|---|---|---|---|
| 8,528,992 | B2* | 9/2013 | Muller | B62D 55/211 |
| | | | | 305/158 |
| 9,174,688 | B2* | 11/2015 | Baum | B62D 55/202 |
| 9,457,851 | B2* | 10/2016 | Delisle | B62D 55/24 |
| 2012/0112526 | A1 | 5/2012 | Mueller | |
| 2014/0239709 | A1* | 8/2014 | Delisle | B62D 55/24 |
| | | | | 305/159 |

OTHER PUBLICATIONS

PCT, International Preliminary Report on Patentability and Written Opinion, International Application No. PCT/EP2014/003017, dated May 26, 2016.

\* cited by examiner

RUBBER TRACK CHAIN SEGMENT

TECHNICAL FIELD

The invention relates to a rubber track chain segment as per the preamble of claim 1. A rubber track chain segment of said type is known from WO 2012/142705 A1.

BACKGROUND

The rubber track chain of WO 2012/142705 A1, which is assembled from multiple rubber track chain segments, has, on the central longitudinal axis of its inner wheel contact side, a multiplicity of guide horns arranged one behind the other. Said guide horns form a quasi-continuous ridge which fits into the grooves formed in the drive wheel, in the tensioning wheel and in the running wheels. The fit of the guide horns with respect to the grooves makes it possible for the crawler chain to be guided during the movement of the rubber track chain vehicle. Furthermore, the rubber track chain of WO 2012/142705 A1 has a multiplicity of projections which are referred to as traction lugs and which are arranged along each side of the rubber track chain. Said traction lugs are designed so as to engage with fitting action into corresponding cavities in the drive wheel. They thus ensure the transmission of power from the engine of the rubber track chain vehicle to the rubber track chain. Between the guide horns and the traction lugs there is situated a plane running surface, on which the running wheels of the rubber track chain vehicle run and which support the weight of the rubber track chain vehicle. The rubber track chain segments of WO 2012/142705 A1 are segments reinforced with tensile members, which segments are each equipped with closure points at both ends. By way of said closure points, it is possible for a segment to be combined with other segments. Each segment is composed of alternating flexible and less flexible regions, whereby firstly the flexibility of the rubber track chain as it circulates, and secondly the stability of the rubber track chain, are ensured.

The closure points of the rubber track chain from WO 2012/142705 A1 can, for geometrical reasons, be accommodated only within the less flexible regions, the so-called chain bodies, because the flexible regions, the so-called deflections, do not offer enough space. This has the disadvantage that the tensile members, which are coupled to the closure points by way of nipples, have only a very short free cable length to the first flexible region, and thus to the deflection. Under the continuous action of chain tension during the circulation through the running gear, this leads to damage to the tensile members in the vicinity of the nipples, and thus to premature failure of the rubber track chain. A chain breakage is safety-relevant, because an affected vehicle can no longer be steered and braked.

SUMMARY

It is therefore an object of the present invention to provide a rubber track chain segment which can be connected to other rubber track chain segments or to itself to form a segmentable rubber track chain, and in the case of which the above-described disadvantages are eliminated.

Said object is achieved by way of the rubber track chain segment according to claim 1. Advantageous embodiments of said rubber track chain segment are specified in the subclaims.

In the context of the present invention, the expression "rubber track chain segment" or "rubber track chain" is not to be understood in a restrictive sense as meaning that rubber is imperatively used in the production of the segments according to the invention. Rather, the rubber track chain segments are produced substantially from polymer, preferably from elastic materials such as natural rubber and/or other elastomers. For structural reinforcement, it is preferably the case that inlays composed of metal and/or fabric are incorporated into said materials in addition to the tensile members.

According to the invention, the ends of the tensile members are positioned in the less flexible regions at the ends of the rubber track chain segment in such a way that the tensile members, proceeding from an exit from the nipples, run over as great as possible a distance through the less flexible regions before running through the adjacent flexible regions. In this way, damage to the tensile members in the vulnerable exit region from the nipples can be permanently avoided. The advantage of nipples arranged on the ends of the tensile members is that they are suitable for being received in an undercut of the connecting devices. Therefore, by way of the arrangement of nipples on the ends of the tensile members, not only is it possible for high tensile forces to be transmitted to the tensile members, but it is also possible for a connection, which is reversible without great effort, of multiple rubber track chain segments to one another or of two ends of one rubber track chain segment to be ensured, because the nipples can be arranged in displaceable fashion in their receptacle of undercut configuration, such that, after removal of an optional means for preventing them from sliding out laterally during operation of the rubber track chain, said nipples can be pushed laterally out of the connecting devices.

In a usage situation, which does not correspond to the principle of the invention, in which tensile members are laid in looped fashion around rods or tubes as a connecting device, such a reversible connection cannot be realized because the tube around which the tensile members are looped must be vulcanized into the rubber track chain segment. An advantage in the case of tensile members laid in looped fashion around rods or tubes is however that, by contrast to the case when using nipples on the ends of tensile members, no vulnerable exit regions of the tensile members from the nipples are formed, because the loop ends run more or less tangentially out of the loop arc that bears against the tube, such that there are no bends of the tensile members around hard edges.

The nipples are preferably cast, forged, pressed or adhesively bonded onto the ends of the tensile members. The nipples may be composed of metallic and/or polymer material. The nipples are preferably of disk-shaped form such that the thickness thereof is only slightly greater than the diameter of the tensile members. In this way, it is possible for a particularly large number of tensile members to be arranged adjacent to one another in the track plane.

The tensile members are preferably of cable-like form; in particular, the tensile members may be realized using steel cables. Steel cable reinforcements can accommodate particularly high tensile forces. However, the use of highly loadable fabric bands is also conceivable. The detachment force of the nipple from its steel cable preferably exceeds the breakage force of the steel cable. In this way, it can be ensured that the total load capacity of the rubber track chain segment is defined by the tensile load capacity of the steel cables, which can generally be easily determined from relevant tables.

The connecting devices are, on the side averted from the side of the exit of the tensile members, preferably designed such that, by virtue of the connecting devices of two ends of one or two rubber track chain segments being coupled, a closure point is formed which is dimensioned so as to correspond at least geometrically, preferably also in terms of measurements, to the flexible regions of the rubber track chain segment. In this way, homogeneous and quiet running of the chain as it circulates through the running gear can be achieved. Here, either the connecting devices themselves form the closure point, or the connecting devices can be supplemented by a coupling part to form the closure point.

In a preferred embodiment of the present invention, the extent in the longitudinal direction of the rubber track chain of the less flexible regions at the ends of the rubber track chain segment is dimensioned such that, in order to reduce the risk of breakage of the tensile members in the region of the ends of the tensile members, it is ensured that a course of the tensile members through the less flexible regions proceeding from the exit from the nipples, before the tensile members run through the adjacent flexible regions, is at least 20 times the tensile member diameter. In this way, it is possible firstly for the risk of fatigue breakage of the tensile members in the vulnerable exit region from the nipples to be significantly reduced, and secondly, owing to the limited length extent of the less flexible regions, a very slender characteristic and high flexibility of the rubber track chain as it circulates can be ensured.

It is preferably ensured that a course of the tensile members through the less flexible regions proceeding from the exit from the nipples is at least 25 times the tensile member diameter. In this way, the risk of fatigue breakage of the tensile members can be further reduced.

In a particularly preferred embodiment of the present invention, it is ensured that a course of the tensile members through the less flexible regions proceeding from the exit from the nipples is at least 30 times the tensile member diameter. In this way, the risk of fatigue breakage of the tensile members in the vicinity of the exit from the nipples is reduced to a minimum, specifically is minimized to the risk of fatigue breakage of the tensile members in the cable region remote from the end.

The rubber track chain segment is preferably suitable for running over a drive wheel and over running wheels of a track chain vehicle, wherein the rubber track chain segment has an outer ground contact side and an inner wheel contact side, wherein the inner wheel contact side has a planar surface from which there project multiple guide horns for the guidance of the rubber track chain during the movement of the track chain vehicle, wherein at least parts of the planar surface serve as a running surface for the running wheels, and wherein, in the planar surface, there are provided depressions for the engagement of drive lugs of the drive wheel. It is thus possible to dispense with the hitherto conventional traction lugs. This leads to a weight saving and thus to a more lightweight, more agile chain, which can therefore be accelerated more easily. This constitutes a major advantage in relation to a conventional rubber track chain with traction lugs, specifically during starting and during braking of the track chain vehicle.

In a preferred embodiment, the rubber track chain or the rubber track chain segment has depressions in the form of holes. This means that the depressions extend through the rubber track chain from the wheel contact side to the ground contact side. The formation of the depressions in the form of holes has the advantage that drive lugs of relatively large or tall form of the drive wheel can engage particularly deeply into the planar surface on the inner wheel contact side of the rubber track chain. This is advantageous in particular during starting and intense acceleration of the track chain vehicle, because, by way of such deep engagement, a high torque can be transmitted from the drive wheel to the rubber track chain.

It may however also be advantageous for the rubber track chain to merely have depressions which do not extend through from the wheel contact side to the ground contact side. This has the advantage of a high structural strength of the rubber track chain. It is however particularly advantageous for the rubber track chain to have both depressions in the form of holes and also depressions which do not extend through from the wheel contact side to the ground contact side. In this way, it is possible to achieve both a high transmission of torque and a high structural strength of the rubber track chain. Furthermore, the depressions which do not extend through assist, in conjunction with relatively small or relatively short drive lugs of the drive wheel, in realizing the propulsion of the track chain vehicle in a more effective manner, specifically during relatively fast travel (without intense acceleration).

The depressions which do not extend through to the ground contact side are preferably in the form of channels which have at least one direction component perpendicular to the longitudinal axis of the rubber track chain. The channels are thus oriented obliquely with respect to the longitudinal axis of the rubber track chain. It is particularly advantageous if the channels are oriented perpendicular to the longitudinal axis of the rubber track chain, because in this case, the transmission of power to the rubber track chain is maximized.

The channels may run over a part or parts of the entire width of the rubber track chain. It is however particularly advantageous if the channels run through between the guide horns over the entire width of the rubber track chain. In this way, it is possible firstly for the drive power to be distributed over the entire width of the rubber track chain by way of correspondingly wide drive lugs, which engage into the channels, of the drive wheel, which is conducive to avoidance of slippage specifically during starting and acceleration. Secondly, another positive synergistic effect is however additionally attained, because in the region of the channels, the rubber track chain is made thinner, which leads to greater bendability of the rubber track chain in the region of the channels. In this way, the rubber track chain can run more easily over the drive wheel and over the tensioning wheel, where the diversion angle of the rubber track chain is at its greatest, without great resistance.

In a particularly preferred embodiment of the invention, one or more holes at the level of the intermediate space between two guide horns on one side adjacent to the central longitudinal axis of the rubber track chain are connected, by way of one of the channels described above, to one or more holes at the level of the intermediate space between said two guide horns on the other side adjacent to the central longitudinal axis of the rubber track chain. By virtue of the fact that the holes lie on a line with the channels, the bendability of the chain in said region is increased yet further, such that, in addition to the high agility of the rubber track chain owing to weight saving, an optimum rolling capability of the rubber track chain over the drive wheel and tensioning roller is realized.

It is preferably the case that, between the holes, metal bands are incorporated, parallel to the central longitudinal axis of the rubber track chain, into the planar surface and into the hole wall. By way of this measure, the service life of the rubber track chain can be significantly increased, because the load on the surfaces in the engagement region of the relatively long drive lugs, which engage into the holes, of the drive wheel is particularly high owing to the particularly intense torque loading.

On the outer ground contact side of the rubber track chain, there are preferably arranged running cams or running ribs which, depending on their shape, may be optimized for the traction between rubber track chain and underlying ground and/or for protecting the underlying ground surface (roadway).

Furthermore, it is advantageous if that lateral flank of the guide horns which points toward the vehicle longitudinal axis is beveled at the front and/or at the rear in the upper region. In this way, the tendency of the rubber track chain to jump out under the action of transverse forces on the running wheels (that is to say in particular during fast cornering) can be reduced.

Further advantageous embodiments and improvements of the invention will emerge from the following description of preferred exemplary embodiments of the invention. It is pointed out that the invention also encompasses further embodiments which emerge from a combination of features specified separately in the patent claims and/or in the description and in the Figures.

Below, the invention will be discussed in more detail on the basis of its advantageous embodiments with reference to the drawings.

DETAILED DESCRIPTION

Figure 1:
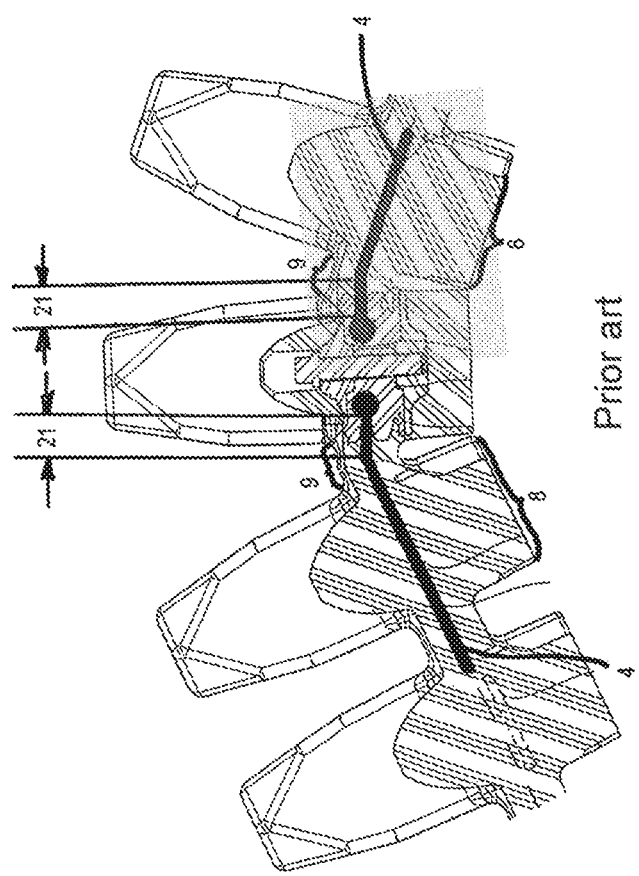
FIG. 1 shows a sectional view through a rubber track chain with tensile members as per the prior art.

FIG. 1 shows a sectional view through a rubber track chain according to the prior art, as has been described in the introductory part of this description in conjunction with WO 2012/142705 A1. The closure points of said conventional rubber track chain are accommodated within the less flexible regions 8, the so-called chain bodies, because the flexible regions 9, the so-called deflections, do not offer enough space. Here, the disadvantage arises that the tensile members 4, which are coupled to the closure points by way of nipples, have only a very short free cable length 21 to the first flexible region 9, and thus to the deflection. Under the continuous action of chain tension during the circulation through the running gear of the track chain vehicle, this leads to damage to the tensile members 4 in the vicinity of the nipples, and thus to premature failure of the rubber track chain.

Figure 5:
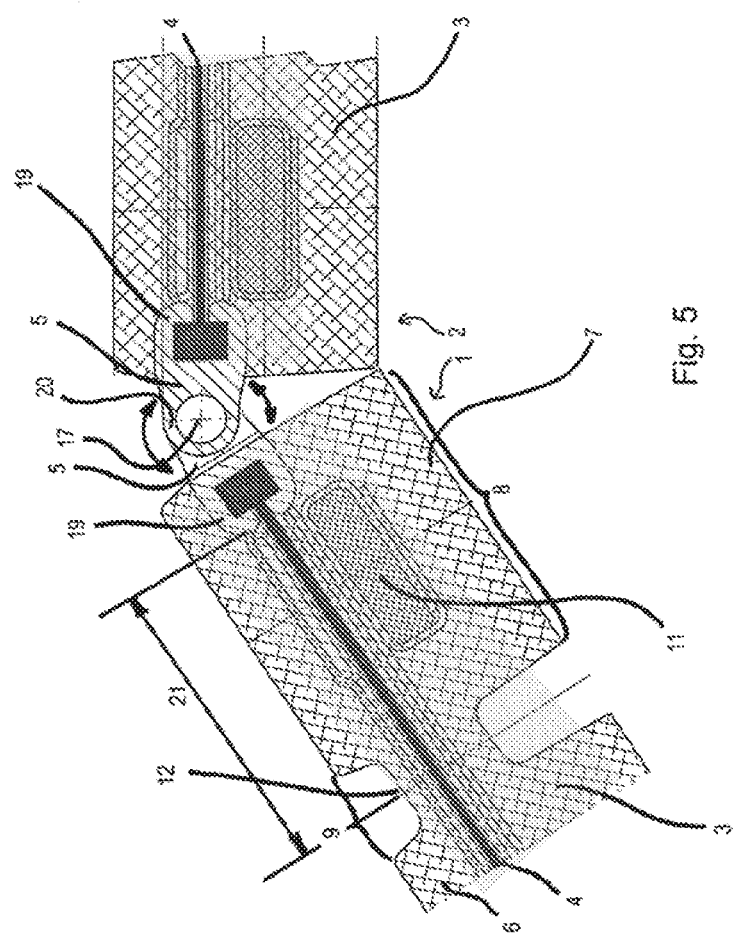
FIG. 5 shows a sectional view of a connecting point between two rubber track chain segments according to the invention.

FIG. 5 shows the connection of the ends of two rubber track chain segments 1, 2 according to the present invention. To increase the load capacity, tensile members 4 are incorporated into the rubber track chain segments 1, 2 between the connecting devices 5. Each of the rubber track chain segments 1, 2 has alternating flexible regions 9 and less flexible regions 8. The lower flexibility of the regions 8 arises primarily from the greater material thickness in relation to the flexible regions 9, but also from the reinforcement by way of traverses 11 incorporated in a transverse direction. In the context of the present application, flexibility refers in particular to the bendability of the corresponding regions 8, 9 about an axis perpendicular to the longitudinal axis of the rubber track chain, that is to say about an axis perpendicular to the plane of the drawing in FIG. 5. According to the invention, the ends of the tensile members 4 are positioned in the less flexible regions 8 at the ends of the rubber track chain segments 1, 2 in such a way that the tensile members 4, proceeding from an exit 19 from the connecting devices 5, run over as great as possible a distance 21 through the less flexible regions 8 before running through the adjacent flexible regions 9.

Here, the extent in the longitudinal direction of the rubber track chain 3 of the less flexible regions 8 at the ends of the rubber track chain segments 1, 2 is preferably dimensioned such that, in the region of the ends of the tensile members 4, it is ensured that a course of the tensile members 4 through the less flexible regions 8 proceeding from the exit 19 from the connecting devices 5, before the tensile members 4 run through the adjacent flexible regions 9, is at least 20 times the tensile member diameter. It is particularly preferable if the free cable length 21 of the tensile members 4 through the less flexible regions 8 proceeding from the exit 19 from the connecting devices 5 amounts to at least 25 times the tensile member diameter. It is optimal if it is ensured that a course of the tensile members 4 through the less flexible regions 8 proceeding from the exit 19 from the connecting devices 5 is at least 30 times the tensile member diameter.

Figure 6:
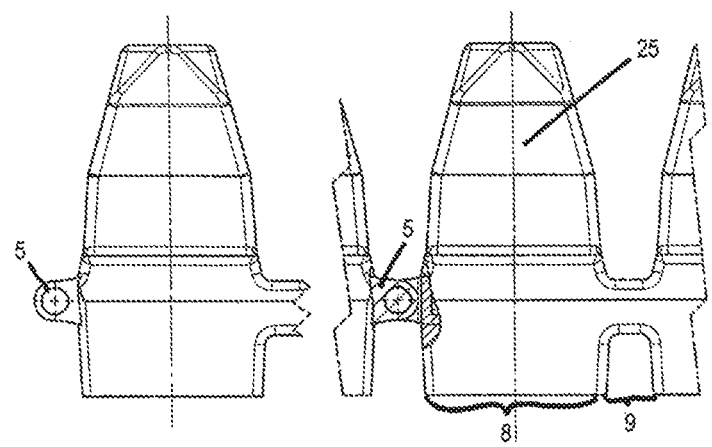
FIG. 6 shows a longitudinal section of a preferred embodiment of the rubber track chain according to the invention.

The connecting devices 5 are, on the side averted from the side of the exit of the tensile members 4, designed such that, by virtue of the connecting devices 5 of two ends of one or two rubber track chain segments 1, 2 being coupled, a closure point 5, 17, 18 is formed which is dimensioned so as to correspond at least geometrically, preferably also in terms of measurements, to the flexible regions 8 of the rubber track chain segments 1, 2, as can be seen particularly clearly when viewing FIGS. 5 and 6 together.

Figure 7:
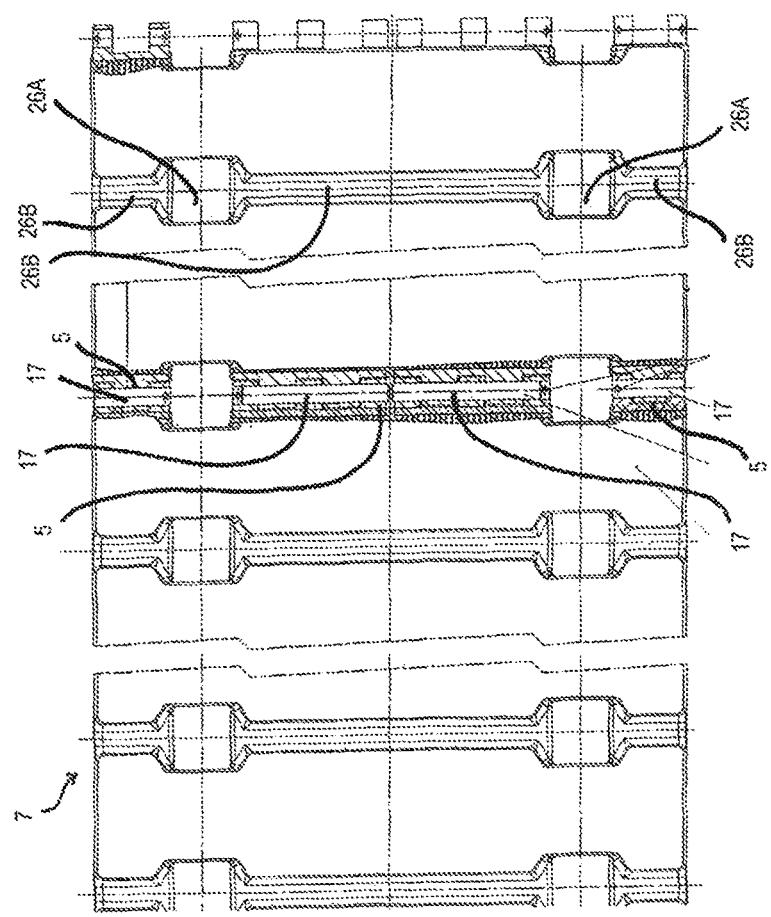
FIG. 7 shows a plan view and partial sectional view of the ground contact side of a preferred embodiment of the rubber track chain according to the invention.

Here, it is firstly possible for the connecting devices 5 (together with one or more pins 17) to themselves form the closure point 5, 17, as illustrated in FIGS. 5 and 7 (principle of the so-called hinged chain).

Figure 9:
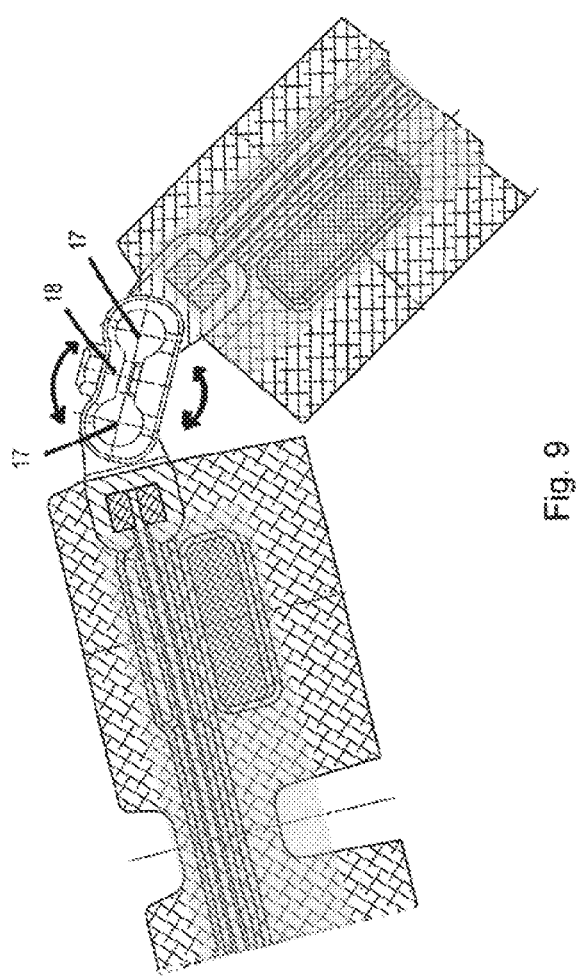
FIG. 9 shows a preferred type of connection of the ends of rubber track chain segments according to the invention.
Figure 10:
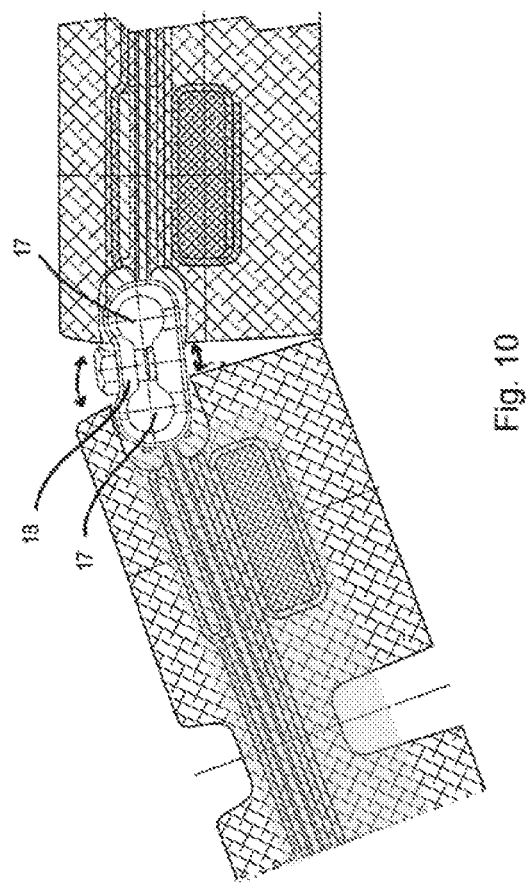
FIG. 10 shows a further preferred type of connection of the ends of rubber track chain segments according to the invention.

Secondly, it is however also possible for the connecting devices 5 (together with at least two mutually parallel pins 17) to be supplemented by a coupling part 18 (a so-called connector) to form the closure point 5, 17, 18, as illustrated in FIGS. 9 and 10 (principle of the so-called connector chain).

Figure 2:
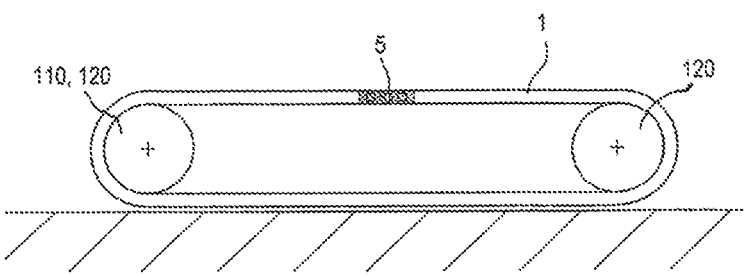
FIG. 2 shows a rubber track chain having a single rubber track chain segment according to the present invention, wherein the two connecting devices of the rubber track chain segment are connected to one another, so as to yield a closed rubber track chain.
Figure 3:
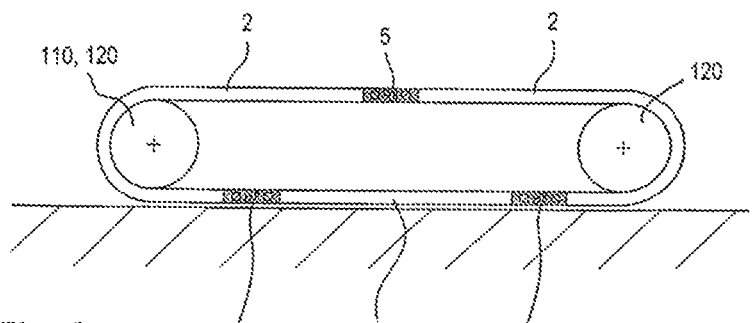
FIG. 3 shows a rubber track chain having multiple rubber track chain segments according to the present invention, wherein each connecting device of a rubber track chain segment is connected to a connecting device of another rubber track chain segment, such that the rubber track chain segments are connected to form a closed chain.
Figure 4:
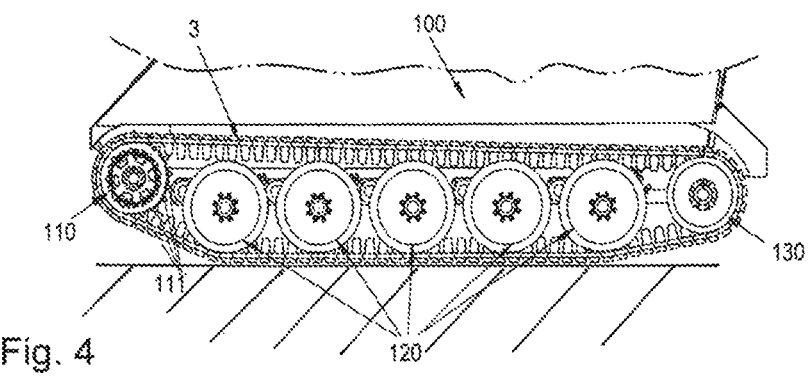
FIG. 4 shows a side view of the use of a rubber track chain according to the invention on a track chain vehicle with drive wheel, running wheels and tensioning roller.

FIG. 4 shows a rubber track chain 3 according to the invention in use on a track chain vehicle 100. The rubber track chain 3 is designed to run over a drive wheel 110, over running wheels 120 and over a tensioning wheel 130. FIG. 2 shows a rubber track chain 3 with a single rubber track chain segment 1 according to the present invention, wherein the two connecting devices 5 of the rubber track chain segment 1 are connected to one another such that a closed rubber track chain 3 is formed. FIG. 3 shows a rubber track chain 3 having multiple rubber track chain segments 2 according to the present invention, wherein each connecting device 5 of a rubber track chain segment 2 is connected to a connecting device 5 of another rubber track chain segment 2, such that the rubber track chain segments 2 are connected to form a closed chain 3.

Figure 8:
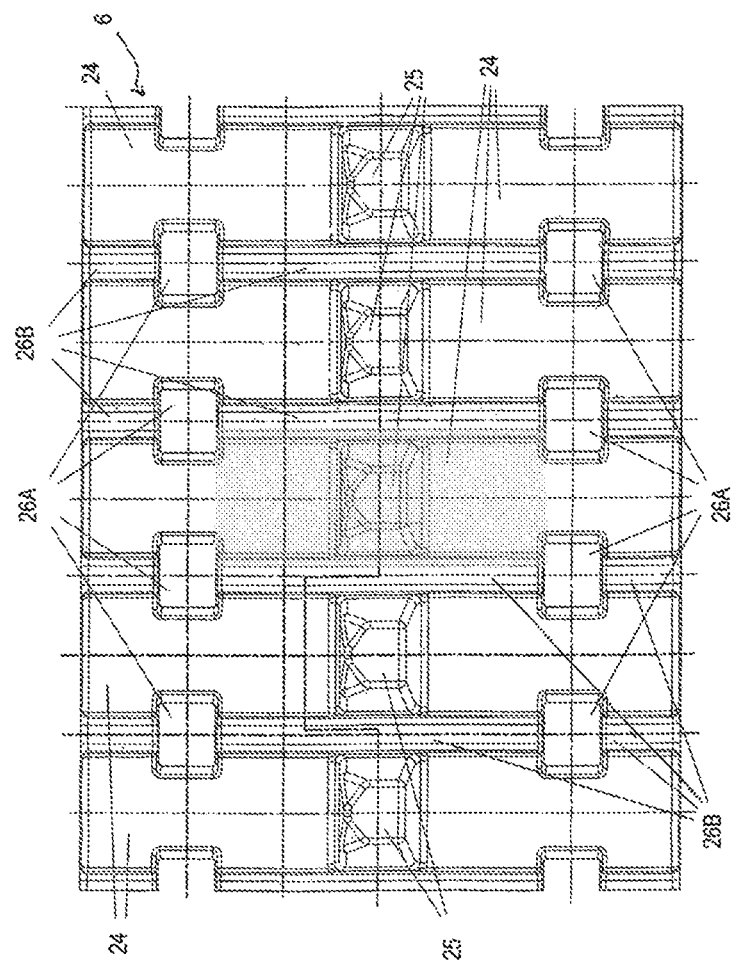
FIG. 8 shows a plan view of the wheel contact side of the embodiment in FIG. 7.

As can be seen from FIGS. 7 and 8, the rubber track chain 3 or the rubber track chain segment 1, 2 has an outer ground contact side 7 and an inner wheel contact side 6. The inner wheel contact side 6 has a planar surface 24, from which there project multiple guide horns 25 for guiding the rubber track chain 3 during the movement of the track chain vehicle 100. At least parts of the planar surface 24 serve as a running surface for the running wheels 120. In the planar surface 24 there are provided depressions 26; 26A, 26B for the engagement of drive lugs 111 of the drive wheel 110.

The guide horns 25 are arranged on the central longitudinal axis of the rubber track chain 3 or of the rubber track chain segment 1, 2. The planar surface 24 extends over the entire width of the rubber track chain segment 1, 2 or of the rubber track chain 3.

The rubber track chain 3 of FIGS. 7 and 8 has depressions in the form of holes 26A which extend through the rubber track chain 3 from the wheel contact side 6 to the ground contact side 7. In the plan view, the holes 26A have a substantially rectangular cross section. The hole edges running perpendicular to the central longitudinal axis of the rubber track chain 3 are beveled, such that the drive lugs 111 of the drive wheel 110 can engage into the holes 26A during the rolling process of the rubber track chain 3 on the drive wheel 110.

Furthermore, the rubber track chain segment 1, 2 has depressions 26B which do not extend through from the wheel contact side 6 to the ground contact side 7. Said depressions 26B are in the form of channels which are oriented perpendicular to the longitudinal axis of the rubber track chain segment 1, 2. The channels 26B run through between the guide horns 25 over the entire width of the rubber track chain segment 1, 2. Here, in each case one hole 26A at the level of the intermediate space between two guide horns 25 on one side adjacent to the central longitudinal axis of the rubber track chain segment 1, 2 is connected, by way of a channel 26B, to in each case one hole 26A at the level of the intermediate space between said two guide horns 25 on the other side adjacent to the central longitudinal axis of the rubber track chain segment 1, 2. It is however also possible for two or more holes 26A to be arranged at the level of the intermediate space between two guide horns 25 on one side adjacent to the central longitudinal axis of the rubber track chain segment 1, 2, and for said holes 26A to be situated in alignment with the channel 26B. Furthermore, it is also possible for the holes 26A not to be situated at the level of the intermediate space between two guide horns 25 but to be arranged between the channels 26B at the level of the guide horns 25. A combination of these two possible arrangements of the holes 26A is also possible, wherein it is then advantageous if the holes 26A at the level of the intermediate spaces between two guide horns 25 and the holes 26A at the level of the guide horns 25 are arranged laterally offset with respect to one another.

On the outer ground contact side 7 there are arranged running ribs which are optimized for the purposes of improving traction and/or protecting the underlying ground. The rubber track chain segment 1, 2 is produced substantially from polymer, preferably from elastic materials such as natural rubber and/or other elastomers. For structural reinforcement, inlays (not shown) composed of metal and/or fabric are incorporated into the rubber track chain segment 1, 2. The inlays or reinforcement means may be in the form of cables, fibers, metal sheets and/or other molded parts.

As can be seen from FIGS. 6 and 8, that lateral flank of the guide horns 25 which points toward the vehicle longitudinal axis may be beveled at the front and/or at the rear in the upper region.

The above-described channels 26B may be utilized, but need not be utilized entirely, for drive purposes, as regards both the number of channels and the length thereof. Accordingly, it is possible for individual channels to be omitted from the drive concept entirely, and in turn, in the case of other channels 26B, it is for example possible for only the inner part (between hole 26A and guide horn 25) or only the outer part (from the hole 26A to the outer edge of the rubber track chain segment 1, 2) to be used for drive purposes.

Even though the above illustration is not restricted to the complete omission of traction lugs on the inner wheel contact side 6 of the rubber track chain 3, it remains to be stated that the rubber track chain 3 or the rubber track chain segment 1, 2 described here also makes do without any traction lugs or other projections extending from the running surface.

LIST OF REFERENCE DESIGNATIONS

1 Rubber track chain segment
2 Rubber track chain segment
3 Rubber track chain
4 Tensile member
5 Connecting device
6 Inner wheel contact side (of 1, 2, 3)
7 Outer ground contact side (of 1, 2, 3)
8 Less flexible region (of 1, 2, 3)
9 Flexible region (of 1, 2, 3)
11 Traverse (in 1, 2, 3)
17 Pin (for 5)
18 Coupling part
19 Exit from connecting device (of 4)
21 Path through less flexible region (of 4)
24 Planar surface (of 6)
25 Guide horn
26 Depression (in 24)
26A Hole (in 24)
26B Channel (in 24)
100 Track chain vehicle
110 Drive wheel
111 Drive lug
120 Running wheel
130 Tensioning wheel

The invention claimed is:
1. A rubber track chain segment (1, 2) which is connectable by way of connecting devices (5) at its ends to other rubber track chain segments (2) or to itself (1) to form a segmented rubber track chain (3), the rubber track chain segment comprising:
one or more tensile members (4) incorporated into the rubber track chain segment (1, 2) between the connecting devices (5), in order to increase tensile load capacity;
nipples arranged on ends of the tensile members (4), wherein the nipples are received in an undercut of the connecting devices (5);
the rubber track chain segment (1, 2) having flexible regions (9) positioned between and separating less flexible regions (8), wherein the less flexible regions are at longitudinal ends of the rubber track chain segment, and wherein the ends of the tensile members (4) are positioned in the less flexible regions (8) at the longitudinal ends of the rubber track chain segment (1, 2) so that the tensile members (4), proceeding from an exit (19) from the nipples, extend (21) entirely through the less flexible regions (8) in a longitudinal direction before extending through an adjacent one of the flexible regions (9); and
wherein an extent in the longitudinal direction of the rubber track chain (3) of the less flexible regions (8) at the ends of the rubber track chain segment (1, 2) is dimensioned such that, in order to reduce a risk of breakage of the tensile members (4) in the region of the exit (19) of the tensile members (4) from the nipples, a course of the tensile members (4) through the less flexible regions (8) proceeding from the exit (19) from the nipples, before the tensile members (4) run through an adjacent one of the flexible regions (9), is at least 20 times the tensile member diameter.

2. The rubber track chain segment as claimed in claim 1, wherein the nipples are cast, forged, pressed or adhesively bonded onto the ends of the tensile members (4).

3. The rubber track chain segment as claimed in claim 1, wherein the nipples are of disk-shaped form such that the thickness thereof is only slightly greater than the diameter of the tensile members (4).

4. The rubber track chain segment as claimed in claim 1, wherein the connecting devices (5) are, on a side of the connecting devices, averted from a side of the exit from the nipples of the tensile members (4), designed such that, by virtue of the connecting devices (5) of two ends of one (1) or two rubber track chain segments (2) being coupled, a closure point (5, 17, 18) is formed which is dimensioned to correspond at least geometrically to the flexible regions (8) of the rubber track chain segment (1, 2).

5. The rubber track chain segment as claimed in claim 4, wherein either the connecting devices (5) themselves form the closure point (5, 17), or the connecting devices (5) are supplemented by a coupling part (8) to form the closure point (5, 17, 18).

6. The rubber track chain segment as claimed in claim 1, wherein the course of the tensile members (4) through the less flexible regions (8) proceeding from the exit (19) from the nipples is at least 25 times the tensile member diameter.

7. The rubber track chain segment as claimed in claim 6, wherein the course of the tensile members (4) through the less flexible regions (8) proceeding from the exit (19) from the nipples is at least 30 times the tensile member diameter.

8. The rubber track chain segment as claimed in claim 1, wherein the rubber track chain segment is suitable for running over a drive wheel (110) and over running wheels (120) of a track chain vehicle (100); the rubber track chain segment (1, 2) has an outer ground contact side (7) and an inner wheel contact side (6), wherein the inner wheel contact side (6) has a planar surface (24) from which there project multiple guide horns (25) for the guidance of the rubber track chain (3) during the movement of the track chain vehicle (100); wherein at least parts of the planar surface (24) serve as a running surface for the running wheels (120); and wherein, in the planar surface (24), there are provided depressions (26; 26A, 26B) for the engagement of drive lugs (111) of the drive wheel (110).

9. The rubber track chain segment as claimed in claim 8, wherein the planar surface (24) extends over an entire width of the rubber track chain segment (1, 2).

10. The rubber track chain segment as claimed in claim 8, wherein the rubber track chain segment (1, 2) has depressions in the form of holes (26A) which extend through the rubber track chain segment (1, 2) from the inner wheel contact side (6) to the ground contact side (7).

11. The rubber track chain segment as claimed in claim 8, wherein the rubber track chain segment (1, 2) has depressions (26B) which do not extend through from the inner wheel contact side (6) to the ground contact side (7).

12. The rubber track chain segment as claimed in claim 11, wherein the depressions (26B) are in the form of channels which are oriented perpendicular to a central longitudinal axis of the rubber track chain segment (1, 2).

13. The rubber track chain segment as claimed in claim 12, wherein the channels (26B) are positioned between the guide horns (25) and extend an entire width of the rubber track chain segment (1, 2).

14. The rubber track chain segment as claimed in claim 13, wherein a first hole (26A) at a level of an intermediate space between two of the guide horns (25) on one side of the central longitudinal axis of the rubber track chain segment (1, 2) is connected, by way of one of the channels (26B), to a second hole (26A) at the level of the intermediate space between said two guide horns (25) on the other side of the central longitudinal axis of the rubber track chain segment (1, 2).

15. A method of forming a rubber track chain segment (1, 2) that is connectable by way of connecting devices (5) at its ends to other rubber track chain segments (2) or to itself (1) to form a segmented rubber track chain (3), the method comprising:
incorporating one or more tensile members (4) into the rubber track chain segment (1, 2) between the connecting devices (5), in order to increase tensile load capacity;
arranging nipples on ends of the tensile members (4), wherein the nipples are received in an undercut of the connecting devices (5);
providing the rubber track chain segment (1, 2) with flexible regions (9) positioned between and separating less flexible regions (8), wherein the less flexible regions are at longitudinal ends of the rubber track chain segment; and
positioning the ends of the tensile members (4) in the less flexible regions (8) at the ends of the rubber track chain segment (1, 2) so that the tensile members (4), proceeding from an exit (19) from the nipples, extend (21) entirely through the less flexible regions (8) in a longitudinal direction before extending through an adjacent one of the flexible regions (9), wherein an extent in the longitudinal direction of the rubber track chain (3) of the less flexible regions (8) at the ends of the rubber track chain segment (1, 2) is dimensioned such that, in order to reduce a risk of breakage of the tensile members (4) in the region of the exit (19) of the tensile members (4) from the nipples, a course of the tensile members (4) through the less flexible regions (8) proceeding from the exit (19) from the nipples, before the tensile members (4) run through an adjacent one of the flexible regions (9), is at least 20 times the tensile member diameter.

16. A rubber track chain segment (1, 2), which is connectable by way of connecting devices (5) at its ends to other rubber track chain segments (2) or to itself (1) to form a segmented rubber track chain (3), the rubber track chain segment comprising:
one or more tensile members (4) incorporated into the rubber track chain segment (1, 2) between the connecting devices (5), in order to increase tensile load capacity;
nipples arranged on ends of the tensile members (4), wherein the nipples are received in an undercut of the connecting devices (5);
the rubber track chain segment (1, 2) having alternating flexible regions (9) and less flexible regions (8), wherein the ends of the tensile members (4) are positioned in the less flexible regions (8) at the ends of the rubber track chain segment (1, 2) so that the tensile members (4), proceeding from an exit (19) from the nipples, extend a distance (21) through the less flexible regions (8) before extending through an adjacent one of the flexible regions (9);
wherein the rubber track chain segment is suitable for running over a drive wheel (110) and over running wheels (120) of a track chain vehicle (100);
the rubber track chain segment (1, 2) has an outer ground contact side (7) and an inner wheel contact side (6), wherein the inner wheel contact side (6) has a planar surface (24) from which there project multiple guide horns (25) for the guidance of the rubber track chain (3) during the movement of the track chain vehicle (100);
at least parts of the planar surface (24) serve as a running surface for the running wheels (120); and wherein, in the planar surface (24), there are provided depressions (26; 26A, 26B) for the engagement of drive lugs (111) of the drive wheel (110);
the rubber track chain segment (1, 2) has depressions (26B) which do not extend through from the inner wheel contact side (6) to the ground contact side (7);
the depressions (26B) are in the form of channels which are oriented perpendicular to a central longitudinal axis of the rubber track chain segment (1, 2); the channels (26B) are positioned between the guide horns (25) and extend an entire width of the rubber track chain segment (1, 2); and
a first hole (26A) at a level of an intermediate space between two of the guide horns (25) on one side of the central longitudinal axis of the rubber track chain segment (1, 2) is connected, by way of one of the channels (26B), to a second hole (26A) at the level of the intermediate space between said two guide horns (25) on the other side of the central longitudinal axis of the rubber track chain segment (1, 2).

* * * * *